(12) United States Patent
Tauchi

(10) Patent No.: US 10,924,428 B2
(45) Date of Patent: Feb. 16, 2021

(54) ONBOARD DEVICE AND METHOD OF TRANSMITTING PROBE DATA

(71) Applicant: Toyota Jidosha Kabushiki Kaisha, Toyota (JP)

(72) Inventor: Jun Tauchi, Ama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/275,979

(22) Filed: Feb. 14, 2019

(65) Prior Publication Data

US 2019/0260687 A1 Aug. 22, 2019

(30) Foreign Application Priority Data

Feb. 16, 2018 (JP) .............................. JP2018-026046

(51) Int. Cl.
| | | |
|---|---|---|
| *H04L 12/911* | (2013.01) | |
| *G06F 16/28* | (2019.01) | |
| *H04L 29/08* | (2006.01) | |
| *H04L 5/00* | (2006.01) | |

(52) U.S. Cl.
CPC .......... *H04L 47/821* (2013.01); *G06F 16/285* (2019.01); *H04L 5/0048* (2013.01); *H04L 67/12* (2013.01)

(58) Field of Classification Search
CPC ..... G06F 16/285; H04L 5/0048; H04L 67/12; H04L 63/20; H04L 47/821; H04W 4/50; H04W 48/18; H04W 8/18; H04W 28/14; H04W 24/08; H04W 4/029; H04W 48/10; H04W 48/16; H04W 68/005; H04W 92/045
See application file for complete search history.

(56) References Cited

U.S. PATENT DOCUMENTS

| | | | | |
|---|---|---|---|---|
| 8,767,758 | B2* | 7/2014 | Sood | H04L 63/20 370/230.1 |
| 9,461,926 | B2* | 10/2016 | Orten | H04W 4/70 |
| 10,009,914 | B2* | 6/2018 | Velu | H04W 72/1242 |
| 2004/0044639 | A1 | 3/2004 | Schoenberg et al. | |
| 2004/0208177 | A1* | 10/2004 | Ogawa | H04L 41/0213 370/392 |
| 2009/0122699 | A1* | 5/2009 | Alperovitch | H04L 45/00 370/230 |
| 2012/0105637 | A1* | 5/2012 | Yousefi | B60R 16/0315 348/148 |
| 2012/0278464 | A1* | 11/2012 | Lehane | H04L 12/1407 709/223 |
| 2014/0077956 | A1* | 3/2014 | Sampath | A61B 5/0022 340/573.1 |
| 2014/0164582 | A1* | 6/2014 | Dawson | H04W 48/18 709/221 |

(Continued)

FOREIGN PATENT DOCUMENTS

JP 2003229874 A 8/2003

*Primary Examiner* — Todd L Barker
(74) *Attorney, Agent, or Firm* — Dinsmore & Shohl LLP

(57) ABSTRACT

An onboard device includes an electronic control unit configured to set priorities depending on a classification of probe data, and a communication unit configured to transmit, prior to probe data having a lower priority among the probe data, probe data having a higher priority among the probe data to a data center.

10 Claims, 2 Drawing Sheets

(56) References Cited

U.S. PATENT DOCUMENTS

| | | | |
|---|---|---|---|
| 2014/0297844 A1* | 10/2014 | Kancherla | H04L 43/0894 |
| | | | 709/224 |
| 2015/0244635 A1* | 8/2015 | Orten | H04W 4/70 |
| | | | 370/230 |
| 2017/0003736 A1* | 1/2017 | Turon | H04L 12/2816 |
| 2017/0026987 A1* | 1/2017 | Velu | H04W 28/0215 |
| 2017/0093866 A1* | 3/2017 | Ben-Noon | G06F 21/35 |
| 2018/0115493 A1* | 4/2018 | Van Leekwijck | H04L 47/522 |
| 2018/0261020 A1* | 9/2018 | Petousis | G07C 5/008 |
| 2019/0364492 A1* | 11/2019 | Azizi | H04W 48/10 |

\* cited by examiner

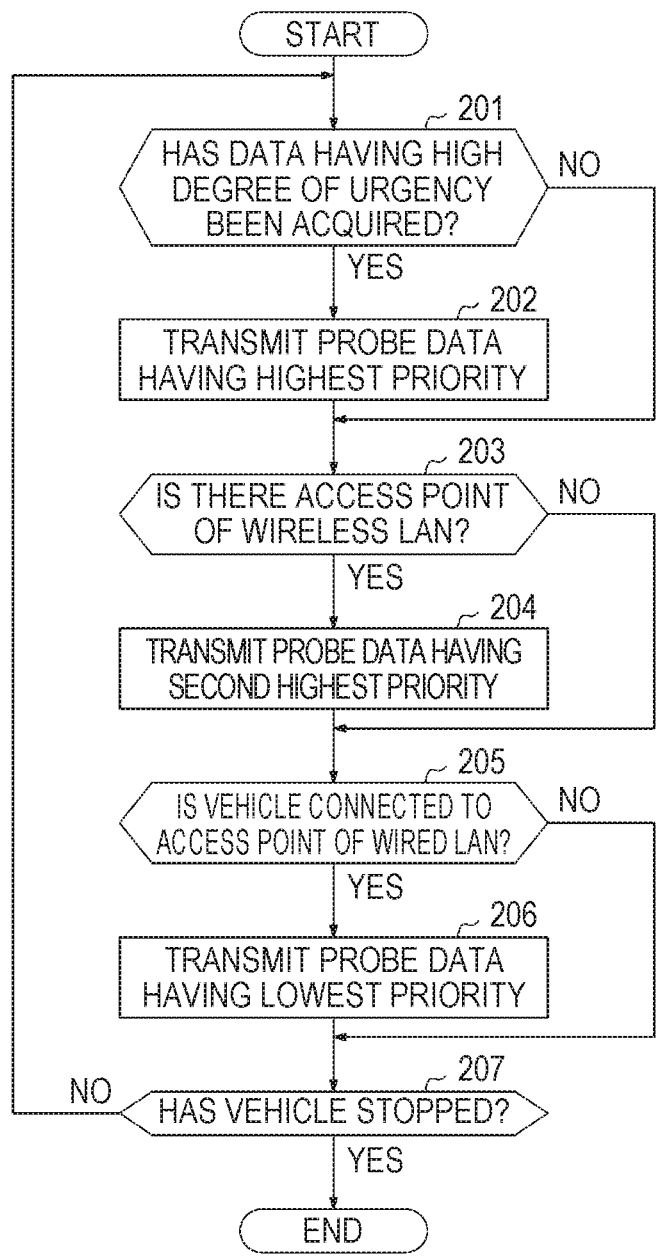

ONBOARD DEVICE AND METHOD OF TRANSMITTING PROBE DATA

CROSS-REFERENCE TO RELATED APPLICATIONS

This application claims priority to Japanese Patent Application No. 2018-026046 filed on Feb. 16, 2018, which is incorporated herein by reference in its entirety including the specification, drawings and abstract.

BACKGROUND

1. Technical Field

The disclosure relates to an onboard device and a method of transmitting probe data.

2. Description of Related Art

Probe data indicating a traveling history can be acquired from a vehicle equipped with a navigation system having a global positioning system (GPS) mounted therein. Such probe data indicating a traveling history is information in which position information of a vehicle varying from time to time with traveling of the vehicle and time information are correlated in a time series. A traveling route of the vehicle can be analyzed by combining the probe data with road map data of the navigation system. For example, a vehicle speed at an arbitrary point can be calculated from a traveling distance and a traveling time. A point at which the vehicle has braked suddenly can be identified from a change in speed. A traveling route, a speed or acceleration in a specific section, and the like of a vehicle can be ascertained simply from probe data of one vehicle, but congestion statuses in a road network or the like can also be ascertained by collecting and analyzing probe data of many vehicles.

Such probe data of many vehicles is called big data. In vehicle manufacturers, services of collecting and accumulating the big data in a data center and feeding back road traffic information such as whether there is a traffic jam on a road have been put into practice.

By analyzing the big data accumulated in vehicle manufacturers and the like, a chronic congestion status of a road or a dangerous spot in which many vehicles brake suddenly can be acquired as data varying depending on positions on the road or over time (such as data varying depending on a time period of a day, data varying depending on a day of the week, or data varying depending on the season).

Accordingly, recently, various utilization methods of the big data which has been collected from many vehicles and analyzed have been considered, such as identifying a dangerous spot on a road and determining reasons for this to help prevention of accidents, identifying a congestion point and drawing up road plans for smoothing traffic, or helping impact analysis for road projects.

For example, a technique of transmitting information on vehicle driving conditions via a radio communication line is mentioned in Japanese Unexamined Patent Application Publication No. 2003-229874 (JP 2003-229874 A).

SUMMARY

In probe data which is transmitted from vehicles to a data center, the probe data having a high degree of urgency (for example, data indicating the presence of a vehicle which is running in reverse on an expressway), the probe data having a middle degree of urgency (for example, data which is used to analyze traffic jams), and data having a low degree of urgency (for example, data which is used to identify a dangerous spot on a road) are mixed.

However, without giving priority to probe data based on differences in a degree of urgency, probe data having a low degree of urgency may be transmitted to the data center prior to probe data having a high degree of urgency.

Therefore, the disclosure provides an onboard device that transmits probe data based on priorities and a method of transmitting probe data.

According to a first aspect of the disclosure, there is provided an onboard device including: an electronic control unit configured to set priorities depending on a classification of probe data; and a communication unit configured to transmit, prior to probe data having a lower priority among the probe data, probe data having a higher priority among the probe data to a data center.

In the first aspect, the electronic control unit may be configured to set priorities depending on the classification of the probe data, the probe data including first probe data and second probe data, a priority of the first probe data being higher than a priority of the second probe data, and determine whether the first probe data has been acquired by the electronic control unit, and the communication unit may be configured to transmit, prior to the second probe data, the first probe data to the data center when the electronic control unit determines that the first probe data has been acquired by the electronic control unit.

In the first aspect, the communication unit may be configured to transmit the probe data to the data center such that the first probe data reaches the data center earlier than the second probe data.

In the first aspect, the onboard device may further include: a storage device storing a program module and the probe data.

In the first aspect, the program module may be configured to perform processing of setting the priorities of the probe data.

In the first aspect, the communication unit may be configured to transmit probe data having different priorities to the data center via one communication line.

In the first aspect, the communication unit may be configured to transmit probe data having different priorities to the data center via a plurality of communication lines.

In the first aspect, the one communication line may include one of a mobile phone line, a wireless LAN, and a wired LAN.

In the first aspect, a plurality of communication lines may include a combination of two or more of a mobile phone line, a wireless LAN, and a wired LAN.

In the first aspect, the communication unit may be configured to select the plurality of communication lines in order to transmits the probe data such that the probe data having the higher priority among the probe data reaches the data center earlier than the probe data having the lower priority among the probe data.

In the first aspect, the electronic control unit may be configured to set priorities depending on the classification of the probe data, the probe data further including third probe data, a priority of the third probe data being lower than the priority of the second probe data, and determine whether the second probe data has been acquired by the electronic control unit; and the communication unit may be configured to transmit, prior to the third probe data, the second probe data to the data center when the electronic control unit determines that the second probe data has been acquired by the electronic control unit.

According to a second aspect of the disclosure, there is provided a method of transmitting probe data, including: setting priorities depending on classifications of probe data; and prior to probe data having a lower priority among the probe data, transmitting probe data having a higher priority among the probe data to a data center.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart illustrating a method of transmitting probe data according to the embodiment of the disclosure.

DETAILED DESCRIPTION OF EMBODIMENTS

Figure 1:
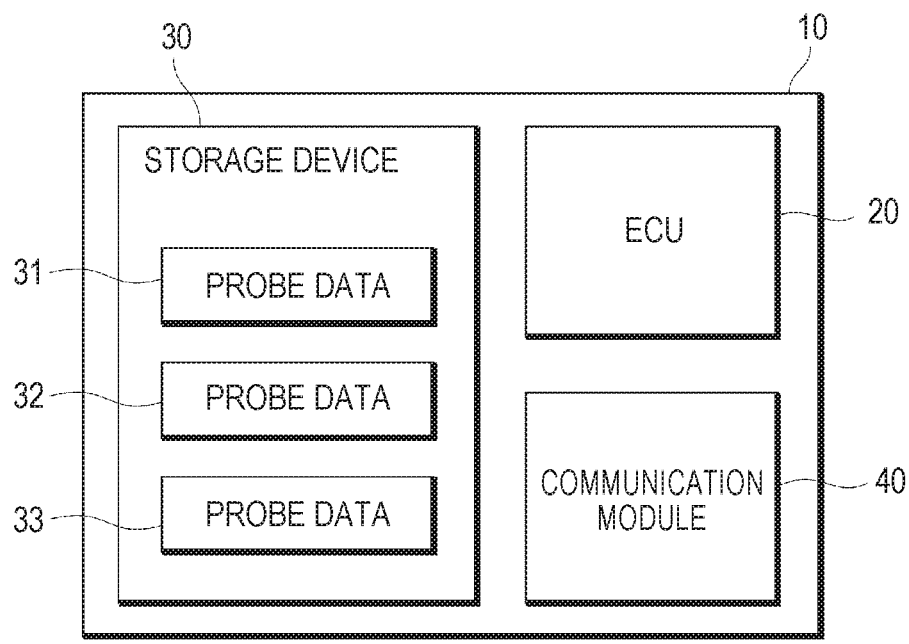
FIG. 1 is a diagram illustrating a hardware configuration of an onboard device according to an embodiment of the disclosure.

Hereinafter, an embodiment of the disclosure will be described with reference to the accompanying drawings. The same elements will be referred to by the same reference signs and description thereof will not be repeated. FIG. 1 is a diagram illustrating a hardware configuration of an onboard device 10 according to an embodiment of the disclosure. The onboard device 10 is mounted in a probe car and includes an electronic control unit (ECU) 20, a storage device 30, and a communication module 40. The storage device 30 is constituted by a semiconductor memory, a disk medium, or the like, and a plurality of classifications of probe data 31, 32, and 33 are stored in a storage area thereof.

First probe data 31 is probe data having a high degree of urgency (for example, image data indicating the presence of a vehicle which is running in reverse on an expressway, the presence of a person or an animal that is walking on an expressway, or the presence of a vehicle which has stopped on an overtaking lane). Such image data can be captured, for example, by an onboard camera.

Second probe data 32 is probe data not having a high degree of urgency but being transmitted to a data center earlier (for example, probe data which is used to analyze traffic jams or to analyze a weather forecast). Probe data in which position information of a vehicle and time information are correlated in a time series can be used to analyze traffic jams at various places. Probe data indicating an amount of rainfall, which is output from an onboard rainfall sensor, can be used to analyze weather forecasts at various places.

Third probe data 33 is probe data having a low degree of urgency (for example, data which is used to identify a dangerous spot on a road). For example, data output from various devices associated with posture control of the vehicle (for example, an antilock brake system that curbs sliding due to locking of vehicle wheels, a vehicle stabilization controller that curbs a sideslip, and a gyro sensor that detects behavior of the vehicle) can be used as the probe data for identifying the dangerous spot on the road (for example, a point at which a vehicle may easily slip or a point at which there is a projecting part or a depression).

The ECU 20 is a computer system including a processor, a memory, and an input and output interface, and a program module for performing processing of setting priorities depending on types of the probe data 31, 32, and 33 (for example, depending on degrees of urgency which are different according to type) is stored in the memory. By analyzing and executing the program module, a function of the processor as a control unit that sets priorities depending on types of the probe data 31, 32, and 33 is realized. The priorities may be set in advance. A function such as the function of the program module may be realized using dedicated hardware resources (for example, an application-specific integrated circuit (ASIC) or a field-programmable gate array (FPGA)) or firmware.

The ECU 20 gives a higher priority to the probe data as a degree of urgency of probe data becomes higher. For example, out of the probe data 31, 32, and 33, the ECU 20 may give the highest priority to the first probe data 31 having a high degree of urgency, give the second highest priority of the second probe data 32 having a middle degree of urgency, and give the lowest priority to the third probe data 33 having a low degree of urgency. That is, the first priority of the probe data 31 is higher than the priority of the second probe data 32, and the priority of the probe data 32 is higher than the priority of the third probe data 33.

The communication module 40 includes a communication interface that transmits the probe data 31, 32, and 33 having different priorities to the data center via one or more communication lines (for example, a mobile phone line, a wireless local area network (LAN), and a wired LAN).

A method of transmitting probe data according to the embodiment of the disclosure will be described below with reference to FIG. 2.

First, in Step 201, the ECU 20 determines whether data having a high degree of urgency (for example, the above-mentioned image data) as the first probe data 31 having the highest priority should be transmitted to the data center has been acquired.

When it is determined in Step S201 that data having a high degree of urgency has been acquired (YES in Step S201), then, in Step 202, the communication module 40 transmits the first probe data 31 having the highest priority to the data center via the mobile phone line (for example, a long term evolution (LTE) line). On the other hand, when it is determined in Step S201 that data having a high degree of urgency has not been acquired (NO in Step S201), the process proceeds to Step S203.

Then, in Step 203, the ECU 20 determines whether there is an accessible access point of the wireless LAN (for example, a rest area (for example, a service area or a parking area) on an expressway or a wireless fidelity (Wi-Fi) point on a street)

When the ECU 20 determines that there is an accessible access point of the wireless LAN (YES in Step S203), then, in Step 204, the communication module 40 is connected to the access point of the wireless LAN and transmits the second probe data 32 having the second highest priority to the data center via the wireless LAN. On the other hand, when the ECU 20 determines that there is not an accessible access point of the wireless LAN (NO in Step S203), the process proceeds to Step S205.

Then, in Step 205, the ECU 20 determines whether the onboard device 10 is connected to an access point of a wired LAN (for example, a LAN connector which is installed in a supply facility for the vehicle (for example, a gas station, a charging station, or a hydrogen station)). An occupant of the vehicle can connect the onboard device 10 to the access point of the wired LAN by manual operations.

When the ECU 20 determines that the onboard device 10 is connected to an access point of a wired LAN (YES in Step S205), then, in Step 206, the communication module 40 transmits the third probe data 33 having the lowest priority to the data center via the wired LAN. On the other hand, when the ECU 20 determines that the onboard device 10 is not connected to an access point of a wired LAN (NO in Step S205), the process proceeds to Step S207.

Then, in Step 207, the ECU 20 determines whether the vehicle has stopped. About the determination, for example, when an ignition key is turned off, the determination result is positive. When the ECU 20 determines that the vehicle has stopped (YES in Step S207), then the process ends. On the other hand, when the ECU 20 determines that the vehicle has not stopped, the process proceeds to Step S201.

An example in which the third probe data 33 is transmitted to a data center via the wired LAN has been described above, but Steps 205 and 206 may be skipped and two classifications of the probe data 32 and 33 may be transmitted to the data center via the wireless LAN in Step 204.

An example in which the second probe data 32 is transmitted to a data center via the wireless LAN has been described above, but Steps 203 and 204 may be skipped and two types of the probe data 32 and 33 may be transmitted to the data center via the wired LAN in Step 206.

According to the embodiment of the disclosure, priorities can be set for the probe data 31, 32, and 33 depending on the degrees of urgency and the first probe data 31 can be transmitted to the data center prior to the second probe data 32 and the third probe data 33. That is, probe data having a higher priority can be transmitted to the data center prior to probe data having a lower priority. Accordingly, the probe data having a higher priority can reach the data center earlier than the probe data having a lower priority. It is possible to reduce communication costs by not transmitting all the probe data 31, 32, and 33 to the data center via the mobile phone line but transmitting two types of probe data 32 and 33 having low priorities to the data center via a line (for example, a wireless LAN or a wired LAN) other than the mobile phone line. Particularly, unlike a wireless LAN, a wired LAN is less affected by change in weather and thus may have a stable communication.

Three classifications of the probe data 31, 32, and 33 have been exemplified above, but the number of classifications of the probe data may be two or four or more. The first probe data 31 having a high priority does not have to be transmitted to the data center via a mobile phone line, and may be transmitted to the data center via a line (for example, a wireless LAN or a wired LAN) other than a mobile phone line. The communication line which is used to transmit probe data may include a combination of two or more of a mobile phone line, a wireless LAN, and a wired LAN.

What is claimed is:

1. An onboard device mounted in a vehicle, the onboard device comprising:
   a storage device storing probe data;
   a processor and a memory configured to
      set priorities depending on a classification of probe data, and
      make a first acquisition determination whether first probe data among the probe data has been acquired by the processor and the memory,
         a priority of the first probe data being higher than a priority of second probe data among the probe data; and
   a communication interface configured to transmit, prior to transmitting the second probe data, the first probe data to a data center via a first communication line among a plurality of communication lines when the processor and the memory determine that the first probe data has been acquired by the processor and the memory, wherein
   the processor and the memory are configured to determine whether there is an accessible access point of a second communication line among the plurality of communication lines other than the first communication line,
   the communication interface is configured to
      connect to the access point of the second communication line when the processor and the memory determine that there is an accessible access point of the second communication line, and
      transmit the second probe data to the data center via the second communication line,
   the processor and the memory are configured to
      make a stop determination whether the vehicle has stopped subsequent to the communication interface transmitting the second probe data;
      repeat the first acquisition determination when the processor and the memory determine that the vehicle has stopped, and
   the plurality of communication lines includes a mobile phone line, a wireless local area network (LAN), and a wired LAN.

2. The onboard device according to claim 1, wherein
   the communication interface is configured to transmit the probe data to the data center such that the first probe data reaches the data center earlier than the second probe data.

3. The onboard device according to claim 2, wherein
   the communication interface is configured to select the first communication line and the second communication line from the plurality of communication lines in order to transmit the probe data such that the first probe data reaches the data center earlier than the second probe data.

4. The onboard device according to claim 1, wherein
   the processor and the memory are configured to
      make a second acquisition determination whether the second probe data has been acquired by the processor and the memory, a priority of third probe data among the probe data being lower than the priority of the second probe data; and
   the communication interface is configured to transmit, prior to transmitting the third probe data, the second probe data to the data center when the processor and the memory determine that the second probe data has been acquired by the processor and the memory and the processor and the memory determine that there is an accessible access point of the second communication line.

5. A method of transmitting probe data carried out by an onboard device mounted in a vehicle, the method comprising:
   setting priorities depending on classifications of probe data;
   making a first acquisition determination whether first probe data among the probe data has been acquired by a processor and a memory of the onboard device, a priority of the first probe data being higher than a priority of second probe data among the probe data;
   prior to transmitting the second probe data, transmitting the first probe data to a data center via a first communication line among a plurality of communication lines when it is determined that the first probe data has been acquired by the processor and the memory;

determining whether there is an accessible access point of a second communication line among the plurality of communication lines other than the first communication line;

connecting to the access point of the second communication line when it is determined that there is an accessible access point of the second communication line;

transmitting the second probe data to the data center via the second communication line;

making a stop determination whether the vehicle has stopped subsequent to transmitting the second probe data; and repeating the first acquisition determination when it is determined that the vehicle has stopped, wherein the plurality of communication lines includes a mobile phone line, a wireless local area network (LAN), and a wired LAN.

6. The onboard device according to claim 1, wherein the first communication line is the mobile phone line, and the second communication line is the wireless LAN or the wired LAN.

7. The onboard device according to claim 4, wherein the processor and the memory are configured to determine whether there is an accessible access point of a third communication line among the plurality of communication lines other than the first communication line and the second communication line, and the communication interface is configured to
connect to the access point of the third communication line when the processor and the memory determine that there is an accessible access point of the third communication line, and
transmit the third probe data to the data center via the third communication line.

8. The onboard device according to claim 7, wherein the first communication line is the mobile phone line, the second communication line is the wireless LAN, and the third communication line is the wired LAN.

9. The method according to claim 5, wherein the first communication line is the mobile phone line, and the second communication line is the wireless LAN or the wired LAN.

10. The onboard device according to claim 7, wherein the processor and the memory are configured to make the stop determination subsequent to transmitting both the first probe data and the second probe data.

* * * * *